April 5, 1938.  W. G. WEHR  2,113,336

CRANE SCALE

Filed May 10, 1932  4 Sheets-Sheet 1

INVENTOR:
WILLIAM G. WEHR
Kwis Hudson & Kent
ATTORNEYS

INVENTOR:
WILLIAM G. WEHR
Kwis Hudson & Kent
ATTORNEYS

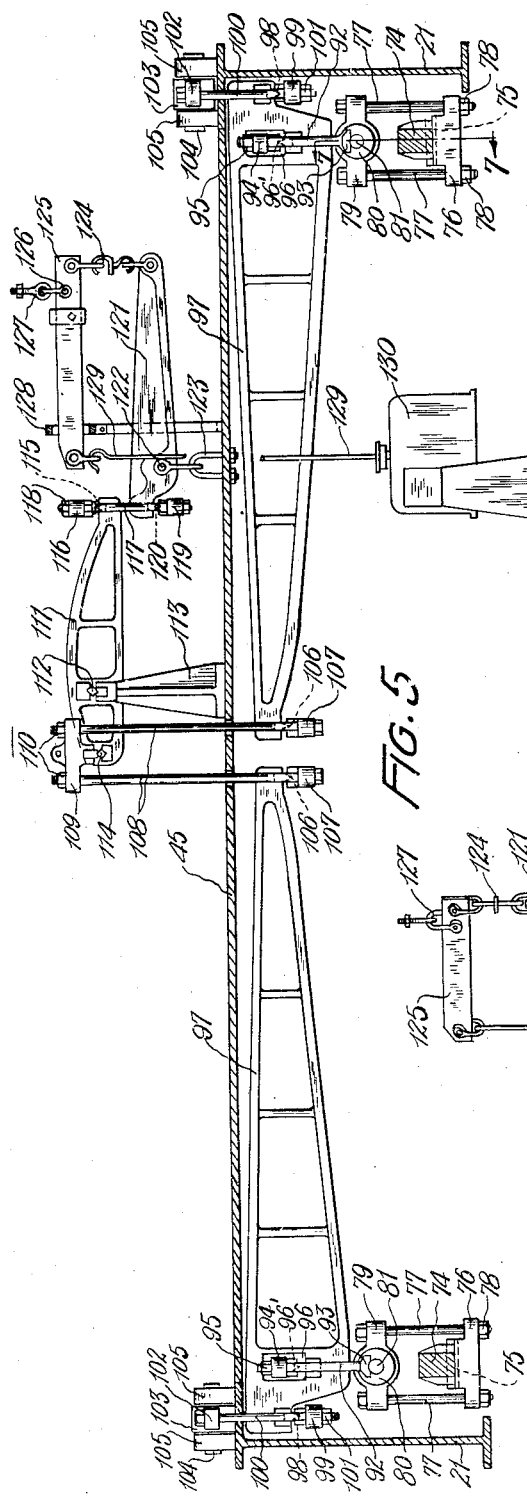

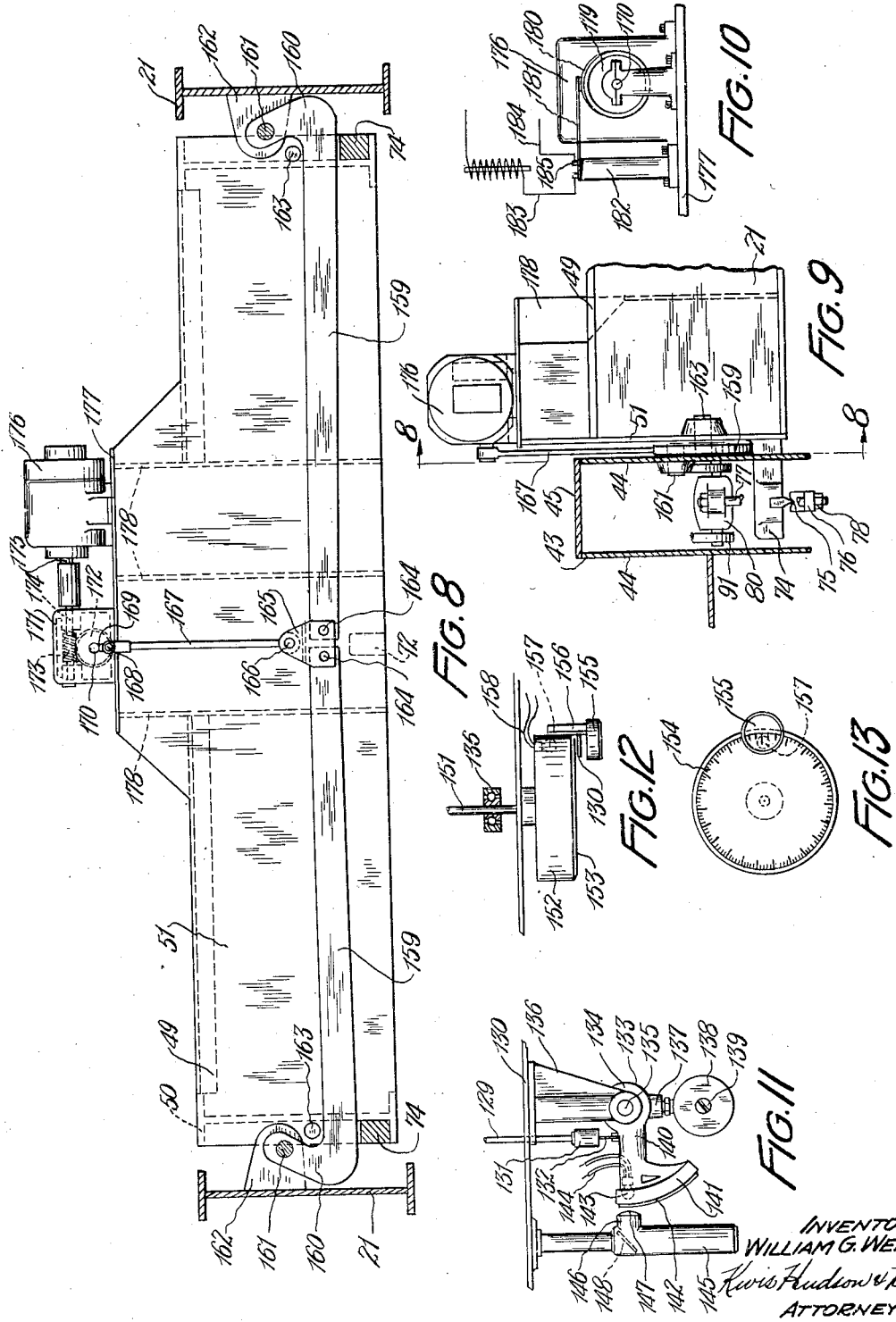

Patented Apr. 5, 1938

2,113,336

UNITED STATES PATENT OFFICE 2,113,336

CRANE SCALE

William G. Wehr, Wickliffe, Ohio, assignor to The Cleveland Crane & Engineering Company, Wickliffe, Ohio, a corporation of Ohio Application May 10, 1932, Serial No. 610,408

14 Claims. (Cl. 212—2)

This invention relates to cranes, preferably of the traveling type, which are adapted to hoist and lower heavy loads of various kinds of material, and has for its primary purpose to provide, as an integral part of the crane structure, a mechanism for accurately weighing the load while suspended therefrom and for indicating the weight of the load in such a manner that it may be visibly read from a distance.

Another object of the present invention is to provide a flexible connection between the trolley frame and the load supporting member which will prevent the stresses ordinarily set up in the trolley frame, due to irregularities in the tracks upon which the trolley runs, from being transmitted to the load supporting member which would interfere with the accuracy of the weighing mechanism.

Another object of the present invention resides in providing a pivoted load supporting member which functions as a part of the weighing mechanism.

A further object of the invention resides in means for rendering the weighing mechanism inoperative when not in use, without interfering in any manner with the otherwise efficient operation of the crane itself.

A still further object of the invention resides in providing a three point support for the load supporting member which will efficiently function irrespective of the manner in which the load may be supported to thereby assure accuracy in the weighing operation.

With the objects above indicated and other objects hereinafter explained in view the invention consists in the construction and combination of elements hereinafter explained in view.

Referring to the drawings:

Fig. 5 is a transverse sectional view taken on line 5—5 of Fig. 1 and showing the weighing mechanism and the manner in which one end of the load supporting member is supported thereby;

Fig. 6 is a fragmentary end elevational view of the weighing mechanism shown in Fig. 5;

Fig. 7 is a fragmentary sectional view taken on line 7—7 of Fig. 5 and showing in detail the anti-friction bearing employed in the construction.

Fig. 8 is a transverse sectional view taken on line 8—8 of Figs. 1 and 9 and showing the means for rendering the weighing mechanism inoperative;

Fig. 9 is a fragmentary vertical sectional view showing the means for rendering the weighing mechanism inoperative;

Fig. 10 is a side elevational view of the limit switch;

Fig. 11 is a detail of the weight indicating means;

Fig. 12 is a modified form of weight indicating means; and

Fig. 13 is a front elevational view of that shown in Fig. 12 with a magnifying device for rendering the weight graduation visible from a distance.

Figure 1:
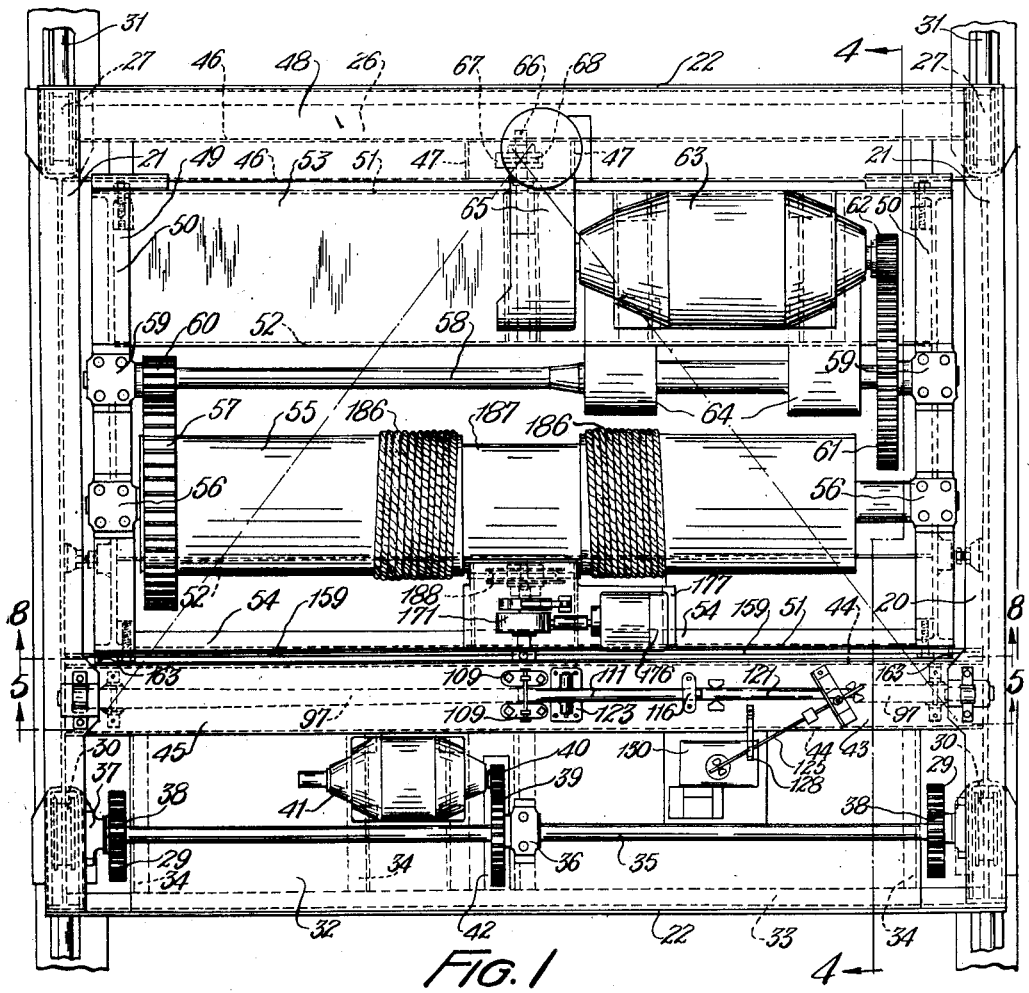
Figure 1 is a top plan view of a crane trolley embodying the present invention.

In the drawings I have illustrated the invention in conjunction with the trolley of a crane with which it is desirably associated for the purpose intended, but the ordinary parts of the crane structure, other than a portion of the bridge upon which the trolley is traversable, is not shown as it is believed that the construction and operation are well known to those versed in the art.

A trolley 20 consists of a pair of spaced longitudinally extending I-shaped end frames 21, preferably built up of sheet material and suitably welded into an integral structure, which are maintained in spaced relation by transversely extending end members or plates 22, which are welded or otherwise secured to the end frames 21. The opposite ends of the end frames 21 are undercut at 23 and 24 respectively and have bolted thereto, or otherwise secured, bearing blocks 25. The bearing blocks 25, secured to the undercut portions 24 of the end frames 21, rotatably support a transversely extending shaft 26 upon which are secured a pair of flanged wheels 27. The bearing members 25, secured to the undercut portion 23 at the opposite end of the end frames 21, rotatably support independent shafts 28 having a short overhang upon the inner adjacent ends thereof upon which is secured external gears 29. Between the bearings 25 flanged wheels 30 are secured, and, together with the flanged wheels 27 at the opposite end of the end frames 21, are engageable with tracks 31 over which the trolley 20 is adapted to move.

The trolley 20 adjacent the flanged wheels 30 has a transversely extending and horizontally disposed plate 32, which is welded or otherwise secured to the upper portion of the cross member 22, and extends a suitable distance inwardly for a purpose to be later described. A transversely extending angle 33 extends beneath the outer edge of the plate 32 and is secured thereto by welding or other suitable means, the plate terminating slightly short of the end frames 21, as more clearly shown in Fig. 1. Longitudinally extending angles 34 are spaced at intervals transversely of the plate where rigidity is required and are welded or otherwise secured to the under side of the plate 32 and the outer ends are welded or otherwise secured to the transverse angle 33.

A transversely extending shaft 35 is rotatably mounted in a bearing 36 secured adjacent the central portion of the trolley and to the plate 32, while the opposite ends are rotatably mounted in bearings 37 secured to the bearing blocks 25 adjacent the flanged wheels 30. The shaft 35 adjacent its opposite ends has secured thereto pinions 38 which mesh with the external gears 29 to effect a driving connection therebetween at the desired ratio to provide the required speed for the trolley, while at the central portion of the shaft 35 an external gear 39 is secured, which meshes with a pinion 40 secured to the armature of an electric motor 41 to thereby drive the shaft 35 at the desired speed. The motor 41 is mounted upon the plate 32 and current therefor may be supplied from any suitable source, such as the usual collectors mounted upon the bridge of the crane and which are not herein illustrated, as the means of supplying this current is well known in the art. The pinions 38 and gears 29 are disposed in the spaces between the adjacent edges of the plate 32 and the end frames 21, suitable clearance having been provided, but the plate 32 is cut away at 42 to provide a clearance for the gear 39.

In the operation of the trolley considerable twisting movement is created therein due to the irregularities in the tracks 31 and the deflection of the bridge upon which the tracks are mounted by reason of the load supported by the trolley and to the starting and stopping of the trolley in moving the load to the desired location. It is essential, therefore, that one end of the trolley 20 be rigidly reinforced so that practically no twisting movement occurs at this location and a transversely extending inverted channel-shaped member 43 is preferably disposed adjacent the drive end of the trolley. This channel-shaped member 43 comprises a pair of vertically extending plates 44, spaced apart longitudinally of the frame and extending from the lower portion of the end frames upwardly a substantial distance above the level of the plate 32, and has a horizontally extended cover plate 45 welded or otherwise secured to the upper edges of the plates 44. The ends of the plates 44 and the top plate 45 are welded or otherwise secured to the end frames 21, while the adjacent edge of the plate 32 is welded to the outer surface of the adjacent plate 44. Furthermore, the inner ends of the angle members 34 are likewise welded to the outer surface of the adjacent plate 44, which results in a rigid structure materially free of any twisting movement.

At the end of the trolley 20, adjacent the flanged wheels 27, a pair of spaced plates 46 extend transversely and have their opposite ends welded or otherwise secured to the end frames 21 and spaced diaphragms 47 are provided adjacent the central portion of the trolley and have their ends welded to the inner surfaces of the plates 46, as clearly shown in Fig. 1. A plate 48 extends transversely in a horizontal plane and is welded at its opposite ends to the end frames 21 and to the outer surfaces of the plates 46 and the diaphragms 47.

A load supporting platform 49 comprises longitudinally extending end members 50, preferably in the form of I sections, spaced apart by cross members 51, preferably in the form of vertically disposed plates which have their opposite ends welded or otherwise secured to the end members 50, and which plates are positioned relatively close to the inner adjacent plate 46 of the trolley 20 and inner adjacent plate 44 of the trolley 20, it being understood, of course, that sufficient clearance is provided around the load supporting platform 49 to permit relative movement thereof with respect to the trolley 20.

Intermediately disposed plates 52, similar to the plates 51, are positioned in substantially parallel relation with respect thereto and have their opposite ends welded or otherwise secured to the end members 50. A plate 53 extends between the cross plates 51 and 52 and is welded to the upper edges of the latter, the opposite ends of the plate being welded to the end members 50, while the opposite plate 51 is suitably reinforced by a pair of angles 54, welded or otherwise secured to the inner surface of the plate 51 and having their outer ends welded or otherwise suitably secured to the end members 50, the inner ends being spaced apart, as shown in Fig. 1, to provide sufficient clearance for a portion of the apparatus which will be later described.

A drum 55 has its trunnions rotatably mounted in bearings 56 which are secured upon the upper flanges of the end members 50, one end of the drum having an external gear 57 secured thereto. A shaft 58 extends transversely of the platform 49 and substantially parallel with the drum 55 and has its opposite ends rotatably mounted in bearings 59 secured to the top flanges of the end members 50. One end of the shaft 58 has secured thereto an external gear 60, which meshes with the external gear 57 of the drum and is of smaller pitch diameter to thereby effect the proper relationship between rotation of the shaft 58 and rotation of the drum 55. The opposite end of the shaft 58 has secured thereto an external gear 61 of large pitch diameter which meshes with a pinion 62 mounted upon the armature of an electric motor 63. This motor is secured upon the plate 53 and has overhanging spaced bearings 64, which serve as an additional support for the shaft 58 which is rotatably mounted therein. The armature of the motor, opposite to that upon which the pinion 62 is mounted, is operatively connected with a solenoid braking mechanism 65 of any suitable type and, in view thereof, detailed explanation of the operation of the braking mechanism is not thought necessary as it forms no part of the present invention.

Figure 4:
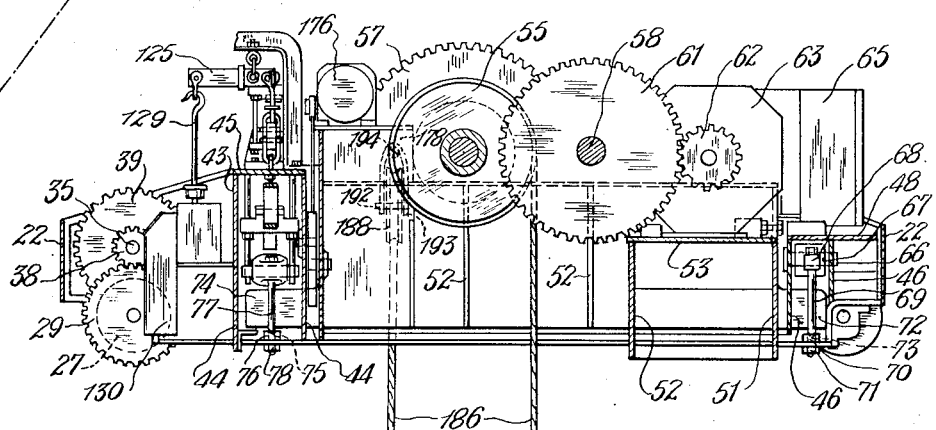
Fig. 4 is a longitudinal sectional view taken on line 4—4 of Fig. 1 and showing the details of the trolley construction.

The platform 49 is preferably supported upon the trolley 20 from three points in any suitable manner to permit independent movement of the platform with respect to the trolley 20. The motor end of the platform 49 is flexibly connected adjacent its central portion with the trolley 20, which results in preventing the transmission of the twisting movement created in the trolley 20 during its travel over the tracks 31 and it is quite important that such a connection be employed as these twisting movements, if imparted to the platform 49, would materially interfere with the accuracy of the weighing mechanism. The construction preferably consists of a longitudinally extending pin 66 having its opposite ends secured within aligned openings provided in the plates 46, as more clearly shown in Fig. 4. A collar 67 is freely mounted upon the pin and has oppositely extending lugs 68 provided with vertically extending openings through which the upper ends of hanger rods 69 extend, the heads being adapted to engage with the lugs while the lower ends extend through openings in a cross bar 70, which is adjustably secured by nuts 71. A lug or extension 72, welded or otherwise secured to the outer surface of the plate 51, is disposed between the hanger rod 69 and is supported upon a knife edge 73 formed between the under side of the lug 72 and the under side of the cross bar 70. It will be seen, therefore, that this construction provides an efficient and practical flexible connection between the platform 49 and the frame 20, which will prevent to a great degree the transmission of twisting movement created in the trolley 20, but at the same time will not interfere with the necessary movement required for the platform 49.

The opposite side of the platform 49 is supported at its corners or, in other words, at two points upon opposite sides of the axis of the pin 66 and it is quite important that these two points of suspension be provided upon the reinforced or rigid end of the trolley 20. In the present instance, lugs or extensions 74 are provided at the lower portion of the end members 50, as more clearly shown in Fig. 7, and are welded or otherwise secured to the end members 50. The extensions 74 are supported upon knife edges 75 provided between the under side of the extensions and the upper side of a cross bar 76. The cross bar has vertically extending openings in its opposite ends which receive therein hanger rods 77 maintained in adjustable position by nuts 78. The upper ends of the hanger rods extend through vertical openings provided in oppositely extending lugs 79 which are formed integral with a sleeve 80, which is in turn loosely mounted upon a pin 81. The detailed construction of this connection is more clearly illustrated in Fig. 7, and it will be noted that the sleeve 80 has a longitudinally extending bore 82 of sufficient diameter to receive the pin 81 therein extending through a portion of the length from one end and an internal bore 83 of larger diameter extending through from the opposite end. An outer race 84 is placed within the bore 83 and abuts with a shoulder 85 provided at the inner end of the bore, the inner face 86 of the race being concave and adapted to receive two sets of balls 87 held in spaced relation by an inner race 88, which is rigidly secured to the pin 81. A member 89 fits within the bore 83 and is provided with an axial opening to receive the pin 81, while at the forward end there is an extension 90 which engages the outer race 84 and retains the latter in proper position against the shoulder 85. It will be noted that with this construction both pivotal movement about the axis of the pin 81 and longitudinal movement over the concave surface 84 are provided so that there is practically no chance of any binding occurring between the movement parts. It should also be understood, that this construction is employed throughout the entire mechanism wherever a connection of this character is required.

The ends of the pins 81 extend through aligned openings in heads 91, which are formed at the lower ends of hanger rods 92 and are secured against accidental displacement by keys 93, which are secured to the heads and are disposed in slots provided in the pins 81. The upper ends of the hanger rods 92 extend through openings in the opposite ends of cross bars 94 and are adjustably secured by nuts 95. These cross bars 94 extend through openings 96 provided in one end of a pair of balancing beams or arms 97 and are supported on knife edges 96' which extend inwardly from the opposite sides of the end frames and are disposed within the channel-shaped member 43. The outer ends of these balancing beams or arms 97 are supported upon knife edges 98 formed upon the under side of the arm and the upper side of a cross bar 99 which is provided with openings to receive the lower ends of hanger rods 100 adjustably maintained in place by nuts 101. The hanger rods 100 are disposed upon opposite sides of the arm 97 and extend through openings provided in oppositely extending lugs 102, formed integral with sleeves 103. Pins 104 rotatably support the sleeves 103 and have their ends secured in spaced bearings 105 mounted upon the upper surface of the end frames 21, it being understood, of course, that suitable openings are provided in the upper flange thereof to accommodate the rods 100 which extend therethrough.

The inner ends of the arms 97 terminate short of one another and are supported upon knife edges 106 provided upon the under side of the ends of the bar and upon the upper side of cross bars 107. The cross bars have openings in their ends to receive hanger rods 108 which pass upwardly through suitable openings provided in the plate 45, and which have their upper ends extending through openings in an equalizing member 109 and are adjustably retained by nuts 110. A balancing arm 111 is fulcrumed upon a knife edge 112 provided upon the upper end of a bracket 113 in turn secured upon the plate 45. One end of the arm 111, beyond the fulcrum 112, is provided with a knife edge 114 which engages the equalizing member 109, while the opposite end is provided with a knife edge 115 upon its upper side, which cooperates or engages a cross bar 116. Openings are provided in the opposite ends of the cross bar 116 and receive therein hanger rods 117 and are adjustably retained by means of nuts 118. The lower ends of the hanger rods extend through openings in the opposite ends of a cross bar 119 which is provided upon its upper side with a knife edge support 120. An arm 121 is pivotally connected at 122 and flexibly connected through links 123 with the plate 45. One end of the arm beyond the pivot 122 is supported upon the knife edge 120, while the opposite end is connected through a flexible link connection 124 with the end of an arm 125. This arm is pivotally connected at 126 and is supported from any suitable superstructure, not shown, by means of a flexible link connection 127. Means for limiting the movement of the opposite end of the arm 125 is provided in the form of a stop 128, which is supported from the plate 45. The opposite end of the arm 125 is detachably connected with a rod 129 which extends into the weighing mechanism housing 130.

Figure 2:
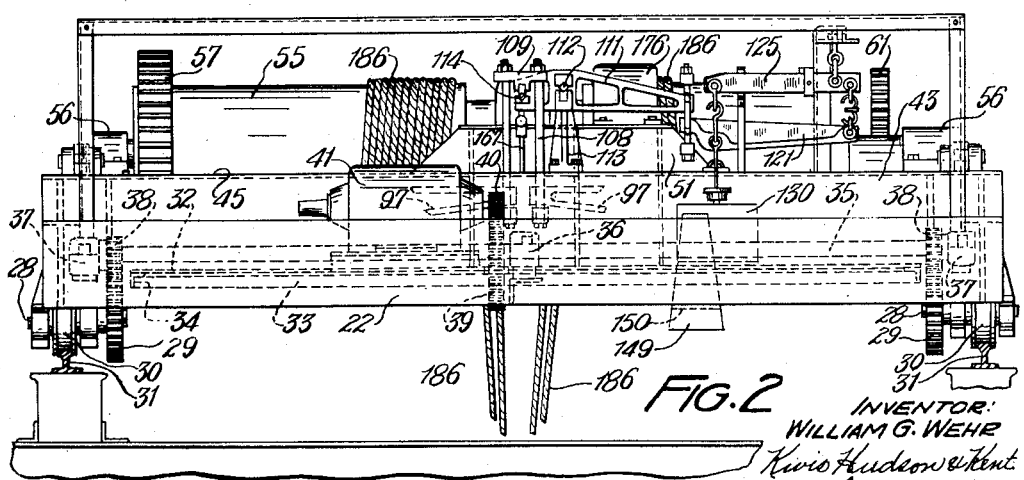
Fig. 2 is an end elevational view of the crane trolley shown in Fig. 1.
Figure 3:
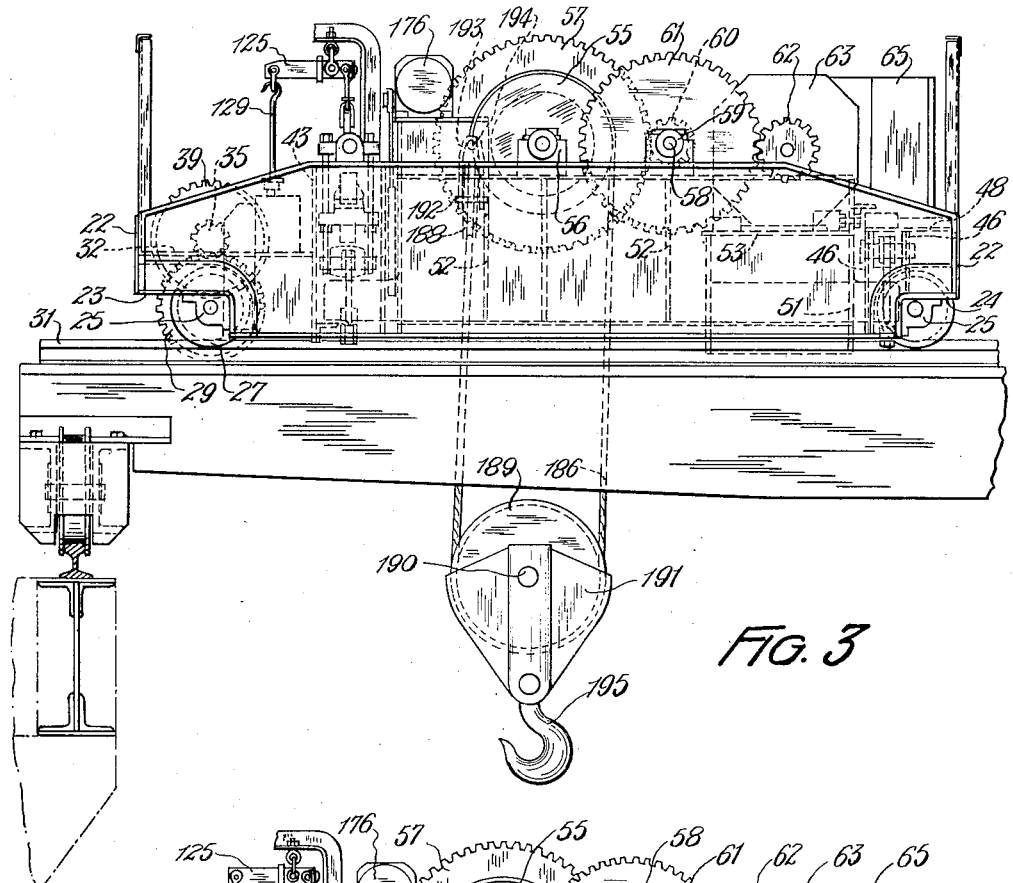
Fig. 3 is a side elevational view of the crane trolley mounted upon a portion of the bridge and its supporting structure.

To the lower end of the rod 129 there is secured a clamp 131 to which is attached one end of a tape 132, while the other end of the tape extends around a cylindrical disc 133 and has its opposite ends secured thereto. The disc is formed integral preferably with a hub 134 which is mounted for pivotal movement upon a pin 135, the opposite ends of which are rigidly secured within a bracket 136 which in turn is secured to the housing 130. This hub 134 has a depending integral arm 137 upon which is slidably mounted a weight 138 secured in any desirable adjusted position by set screw 139. Extending laterally and formed integral with the hub 134 is an arm 140 at the outer end of which is secured a segment 141 which carries a transparent face plate 142 provided with a series of graduations. An electric light 143 is disposed behind the face of plate 142, as shown in Fig. 11, and is connected by conductors 144 with any suitable source of current supply. The light 143 may be supported in any suitable manner so as to be unaffected by movement of the segment 141. A tubular member 145 is secured to the housing 130 and is provided with a laterally extending tubular extension 146 within which a magnifying glass 147 is mounted to enlarge the graduations upon the face plate 142 and to direct the same downwardly so as to be readily readable from the ground below. A reflector 148 is angularly mounted within the tubular member 145. This tubular member 145 is preferably disposed within a hood 149 secured to the casing 130, as better shown in Fig. 2, and has a transparent plate 150 secured therein, which, if desirable, may also be of a magnifying character. When an upward pull is exerted upon the rod 129, the weight 138 is moved about the axis of the pin 135 in proportion to the force applied and, as the arm 140 is also secured to the hub 134, it likewise moves about the axis of the pin 135 and presents the proper graduation adjacent the magnifying glass 147 which indicates the weight and, due to the magnification thereof, is readily readable from a distance of hundreds of feet.

A modification of the indicating mechanism is shown in Figs. 12 and 13 and, in this particular case, the pin 151, which corresponds with the pin 135 in Fig. 11, is rotatably mounted in the brackets 136 and has an end extending beyond the bearings to which is secured a cylindrical shell 152. A transparent face plate 153 is secured to the outer side of the shell and is provided with graduations 154. A magnifying glass 155 is secured by a bracket 156 to a portion of the housing 130 and an electric light 157 is also secured to the housing 130 in any suitable manner and is normally disposed within the shell 152 directly behind the magnifying glass 155, so as to illuminate the graduations. Conductors 158 connect the light 157 with any suitable source of current supply.

There are times, of course, when it is not desired to employ the weighing mechanism, but to otherwise use the crane, in which event it is advantageous to lock the platform 49 against movement and at the same time this protects the knife edges upon which one end of the platform is supported. While any suitable means may be employed for accomplishing this result, the preferred construction is shown in Fig. 8 which comprises a pair of transversely extending arms 159 having hook outer ends 160 which are pivotally connected to pins 161 secured in inwardly extending brackets 162, welded or otherwise secured to the end frames 21. A pair of longitudinally extending pins 163 are located at the opposite sides of the platform 49 and rigidly secured to the end members 50, the pins being positioned so as to be engaged by the hooked ends 160 of the arms 159. The inner ends of the arms 159 are pivotally connected at 164 to a bracket 165 which in turn is pivotally connected at 166 to the lower end of a rod 167. The upper end of the rod is pivotally connected at 168 to one end of an arm 169, while the opposite end is rigidly secured to a transversely extending shaft 170. This shaft 170 has its ends rotatably secured in bearings within a housing 171 and has keyed thereto a worm gear 172, which meshes with a worm 173 formed upon one end of a transversely extending shaft 174. One end of the shaft 174 is connected with the armature 175 of an electric motor 176 mounted upon a plate 177 secured upon the upper ends of vertically extending diaphragm plates 178, which for rigidity are welded or otherwise secured to the inner adjacent surface of the plate 51. In Fig. 10 a detail of a limit switch for limiting the operation of the motor 176, and consequently the movement of the platform 49, is shown which consists of a rotary disc 179 secured to the shaft 170. This disc has a raised surface 180 upon one portion of its periphery which is adapted to cooperate with the free end of a flexible arm 181, while the opposite end is secured to a bracket 182 mounted upon the plate 177. The arm 181 is preferably directly connected with a conductor 183 in the motor circuit and a conductor 184, also connected in the motor circuit, has one end connected with a contact 185 which is suitably supported, but placed normally out of contact with the arm 181. It will be noted, therefore, that the flexible arm 181 is raised due to engagement with the surface 180 on the disc 179 which engages the contact 185 and thus interrupts the motor circuit.

When it is desired to elevate the platform 49, the motor 176 is started which causes rotation of the worm 173 and worm wheel 172, thus raising the inner ends of the arms 159 and, as the outer ends engage with the pins 163, the platform is moved into inoperative position and out of engagement with the knife edges which support the lugs 74.

The drum 55 is of the double groove type with the inner adjacent portions of the cable 186 spaced apart as shown in Fig. 1, the drum having a circumferential groove 187 extending between the cables. This groove 187 is provided to permit positioning of the cable sheave 188 so that the axis of the cable, which extends over the sheave 188, will be in alignment transversely with the longitudinal axis of the cable, the arrangement being important to insure accurate weighing irrespective of the manner in which the load may be suspended from the cable.

The looped end of the cable extends downwardly and around a pair of spaced sheaves 189, which are rotatably mounted upon a pin 190 having its opposite ends secured in a block 191, and then extends upwardly and is supported upon the sheave 188. This sheave is rotatably mounted upon a pin 192, the ends of which are secured within the free ends of a bracket 193, the upper end being pivotally mounted upon a pin 194 which has its opposite ends secured within the diaphragm plates 178. It is further important that the axis of the pin 194 be in horizontal alignment with the axis of the drum 55. The lower end of the block 191 is provided with a hook 195 which is adapted to support a load to be weighed.

Referring back to the weighing mechanism or balancing mechanism, as shown in Fig. 5, attention is called to the fact that the knife edges below the plate 45 should be in horizontal alignment and the knife edges above the plate 45, with the exception of the knife edge 120, should also be in horizontal alignment.

It is of considerable importance in producing an accurate weighing mechanism of this character that the trolley frame be rigidly reinforced at one end, which applicant has accomplished by providing the transversely inverted channel-shaped member 43 and by welding these members together and to the end frames 29. It is further desirable, therefore, to mount the drive motor 41 for the operation of the trolley upon this reinforced end, because of the additional rigidity afforded, although it is not essential that the trolley be driven at this particular location.

It is, however, important that the movable platform 49 be supported from three points arranged in triangular relation, as indicated by the dotted lines in Fig. 1, so that an accurate weighing of the load will be accomplished irrespective of the location from which it is suspended. It is furthermore important that the platform 49 be supported from two points at one end adjacent the opposite corners and that these points of support be adjacent the reinforced end of the trolley frame or next to the transverse member 43, as shown herein. This will result in preventing any twisting movement of the trolley frame at this end, during its travel along the rails, being imparted to the movable platform 49 adjacent the supports and will, therefore, not cause any twisting movement at this end of the platform.

The forward end of the trolley does not need to be so rigidly reinforced so that the flanged wheel 27 will engage with the rails 31, irrespective of any deflections or twisting movement which will occur therealong by reason of deflection due to various loads, and by reason of the starting and stopping operation of both the trolley and the bridge. In order that the twisting movement or deflections will not be transmitted to the platform 49, the latter is flexibly connected adjacent its longitudinal central portion with the adjacent end member of the trolley frame which permits pivotal movement at this point thereby preventing the transmission of such twisting movement or deflections to the platform.

In operation of the device the load to be weighed is suspended from the hook 195 which in turn is suspended from the hoisting mechanism mounted solely upon the movable platform 49. This platform being supported from the lever arms or balancing mechanism in the present instance multiplies the movement of the platform 49 about the pivot 66 and therethrough causes the weight 138 to be rotated about the pivot 135 in amount proportional to the load which is suspended from the hook 195. Movement of the weight 138 also causes the segment 141 to be moved which indicates the weight of the load and is readily readable by means of the magnifying glass 147. It should be understood that the weight of the load can be readily seen by an operator upon the ground below the trolley and in many instances this distance is 100 feet or more, so that the desirability of being able to determine the weight of the load by the operator will be readily recognized by those skilled in the art.

Furthermore, by suitable arrangement the weight may be additionally viewed by the operator in the cab of the crane, which, while not shown, is within the scope of the invention.

While I have described the preferred embodiment of my invention it is to be understood that I am not to be limited thereto inasmuch as changes and modifications may be resorted to without departing from the spirit of the invention as defined in the appended claims.

Having thus described my invention, I claim:

1. A trolley comprising a frame having side members and end members connected thereto, an inverted channel-shaped member extending transversely of said frame and secured to said end members, a second frame member having side members and end members connected thereto, means for flexibly connecting one end of said second frame member adjacent its central portion to the adjacent end of said first frame member, the opposite end being adapted for free movement with respect to said first frame, means for supporting the free end of said second frame member at points adjacent the opposite corners thereof, balancing means supported by said channel-shaped member and connected with said supporting means, a weight connected to said balancing means and movable in proportion to the movement of said second frame, and means for indicating the movement of said weight visibly readable from a distance.

2. In an overhead traveling crane, the combination of a movable trolley, a hoist frame, hoist mechanism comprising a block and cable carried by said hoist frame, means for supporting said cable with the center of gravity of said cable fixed in a vertical plane irrespective of the distance of said block from said hoist frame, means at one point for pivotally supporting one end of said hoist frame in said trolley, and independent means at another point comprising weighing mechanism for supporting the other end of said hoist frame in said trolley.

3. In an overhead traveling crane, the combination of a movable trolley, a hoist frame, hoist mechanism comprising a block and cable carried by said hoist frame, means for supporting said cable with the center of gravity thereof fixed in a vertical plane irrespective of the distance of said block from said hoist frame, means at one point for pivotally supporting one end of said hoist frame against vertical movement in said trolley, and independent means at another point having a universal joint and comprising automatic weighing mechanism for supporting the other end of said hoist frame in said trolley.

4. In an overhead traveling crane, the combination of a movable trolley, a hoist frame, hoist mechanism carried by said hoist frame, means for supporting said hoist frame in said trolley at the apex of an imaginary triangle, and means for supporting said hoist frame in said trolley at the base of said imaginary triangle, one of said means comprising weighing mechanism, said hoist mechanism comprising a block and cable the center of gravity of which is fixed in a vertical plane parallel with the base of said triangle irrespective of the distance of said block from said hoist frame.

5. In an overhead traveling crane, the combination of a movable trolley, a hoist frame, hoist mechanism carried by said hoist frame, means for supporting said hoist frame in said trolley at the apex of an imaginary triangle, and means comprising weighing mechanism for supporting said hoist frame in said trolley at the base of said imaginary triangle, said hoist mechanism comprising a block and cable the center of gravity of which remains fixed in the vertical plane parallel with the base of said imaginary triangle irrespective of the distance of said block from said hoist frame.

6. In an overhead traveling crane, the combination of a movable trolley, a hoist frame, hoist mechanism carried by said hoist frame, flexible means for supporting said hoist frame in said trolley at the apex of an imaginary triangle, means including universal joints and comprising automatic weighing mechanism for supporting said hoist frame in said trolley at the base of said imaginary triangle, said hoist mechanism comprising a block and cable, and means for supporting said cable with the center of gravity thereof fixed in a vertical plane parallel with the base of said imaginary triangle irrespective of the distance of said block from said hoist frame, said trolley frame being reinforced adjacent the base of said imaginary triangle to make the same substantially rigid at that point.

7. In an overhead traveling crane, the combination of a movable trolley, a hoist frame, means comprising weighing mechanism for supporting said hoist frame in said trolley, a cable drum having a reduced section in the center thereof to form a groove or recess therein rotatably supported by said hoist frame, means for rotating said drum, and a sheave rotatably supported by said hoist frame projecting in said groove or recess in the cable drum.

8. In an overhead traveling crane the combination of a trolley frame, a hoist frame, means comprising a universal joint for movably supporting said hoist frame by said trolley frame, hoist mechanism including a cable drum and a motor for rotating the same carried by said hoist frame, means for yieldably resisting the movement of said hoist frame with a force proportional to the movement thereof, and means for indicating the extent of movement of said hoist frame.

9. In an overhead traveling crane the combination of a trolley frame, a hoist frame, hoist mechanism including a cable drum and a motor for rotating the same carried by said hoist frame, means for pivotally supporting one end of said hoist frame by said trolley frame, means including a universal joint for movably supporting the other end of said hoist frame by said trolley frame, means for yieldably resisting the movement of said hoist frame about said pivotal support with a force proportional to the movement thereof, and means for indicating the extent of movement of said hoist frame.

10. In an overhead traveling crane the combination of a trolley frame, a hoist frame, hoist mechanism carried by said hoist frame, means comprising knife edges for supporting said hoist frame in said trolley frame, and means for lifting said hoist frame off of said knife edges.

11. In an overhead traveling crane the combination of a trolley frame, a hoist frame, hoist mechanism carried by said hoist frame, means comprising knife edges for supporting said hoist frame in said trolley frame, a lever pivotally supported by one of said frames and adapted to operatively engage the other of said frames for lifting said hoist frame off of said knife edges when said lever is rotated in one direction about its pivotal support, and means for moving said lever about its pivotal support.

12. In an overhead traveling crane the combination of a trolley frame, a hoist frame, hoist mechanism carried by said hoist frame, means comprising a pivoted lever for supporting said hoist frame in said trolley frame, and means comprising a universal joint for supporting said lever.

13. In an overhead traveling crane the combination of a trolley frame, a hoist frame, hoist mechanism carried by said hoist frame, means comprising a pivoted lever for supporting said hoist frame in said trolley frame, and means comprising a universal joint for connecting said hoist frame to said lever.

14. In an overhead traveling crane the combination of a trolley frame, a hoist frame, hoist mechanism carried by said hoist frame, means comprising a pivoted lever for supporting said hoist frame in said trolley frame, means comprising a universal joint for supporting said lever, and means comprising a universal joint for connecting said hoist frame to said lever.

WILLIAM G. WEHR.